United States Patent Office 3,454,423
Patented July 8, 1969

3,454,423
N-PROPYL CARBAMATE RESIN COMPOSITION AND METHOD OF TREATING A FABRIC THEREWITH
Sidney Cohen, Hillsdale, N.J., and Morton Schlesinger, New York, N.Y., assignors to Millmaster Onyx Corporation, New York, N.Y., a corporation of New York
No Drawing. Filed Nov. 21, 1966, Ser. No. 595,573
Int. Cl. D06m 13/40; C08g 51/26
U.S. Cl. 117—139.5                                       9 Claims

ABSTRACT OF THE DISCLOSURE

In order to increase both the appearance and the durability of cellulosic fabrics after repeated launderings, the fabrics are treated with a composition containing as the active ingredient, a mixture of n-propyl carbamate formaldehyde resin and isopropyl carbamate formaldehyde resin wherein the proportion of the n-propyl resin relative to the isopropyl resin is from about 75:25 to about 67:33 by weight. This resin mixture is applied to the fabric in an aqueous composition, preferably with a catalyst and, if desired, with additional components serving as lubricating agents, wetting agents and to provide better "hand."

---

This invention relates to a method and composition for treating cloth fabric in order to provide both satisfactory "wash-wear" properties (ability to maintain their good appearance despite repeated launderings) and satisfactory "durability" properties (ability to withstand abrasion, stretch, strain, etc., during use).

A large proportion of laundering is today done in the home where the housewife has neither the professional skill nor thte processes and materials to provide the well-finished appearance that is obtainable in good professional launderies. It is, therefore, important to manufacture the fabric in such a manner as to provide a built-in good appearance regardless of the laundering conditions. However, this result has heretofore been obtainable only by the sacrifice of the durability qualities of the fabric. It is, therefore, the primary object of the present invention to overcome this difficulty by making it possible to obtain both satisfactory "wash-wear" properties and satisfactory durability by a simple and relatively inexpensive treatment of the fabric. It is preferable, in this respect, to obtain these results at so-called "low cure cycles."

In accordance with the present invention, both satisfactory "wash-wear" and durability properties are provided by treating the fabric with an aqueous composition containing a mixture of n-propyl carbamate formaldehyde resin and isopropyl carbamate formaldehyde resin in a proportion of about 75:25 to about 67:33 by weight. Within this range, these two resins have been found to act synergistically, whereas, either above or below this range, the "wash-wear" and/or durability qualities are less satisfactory. In addition, fabrics treated in this manner also have high resistance to "acid souring" and chlorine retention.

This invention is applicable to most of the various types of fabrics now in general use, both natural and synthetic. It is, however, particularly well adapted to cotton and polyester-cotton materials.

The following examples serve to illustrate the invention, but are not intended to limit the scope of the invention except as claimed:

EXAMPLE 1

| Components: | Parts by weight |
|---|---|
| n-Propyl carbamate formaldehyde resin (reaction product of 1 mol n-propyl carbamate with 2.5 mols formaldehyde at a pH of 10 to 11, consisting of a mixture of dimethylol n-propyl carbamate and monomethylol n-propyl carbamate) | 20.0 |
| Isopropyl carbamate formaldehyde resin (reaction product of 1 mol isopropyl carbamate with 2.5 mols formaldehyde at a pH of 10 to 11, consisting of a mixture of dimethylol isopropyl carbamate and monomethylol isopropyl carbamate) | 10.0 |
| Magnesium chloride (30% aqueous solution) | 7.2 |
| "Polasan PEL" (a nonionic polyethylene emulsion containing 40% low-density polyethylene—Onyx Chemical Company) | 2.0 |
| "Karamul 142ST" (a reactive acrylic emulsion containing 45% solids—Refined Products Company) | 2.5 |
| "Neutronyx 600" (a nonionic wetting agent of the polyethoxy - nonylphenol type—Onyx Chemical Company) | 0.2 |
| Water to make 100 parts. | |

Of the above components, the magnesium chloride serves as a catalyst, the "Polasan PEL" as a lubricant, the "Karamul 142ST" to give better "hand," and the "Neutronyx 600" as a wetting agent.

These components were mixed at room temperature and pressure to form the treating composition.

EXAMPLE 2

| Components: | Parts by weight |
|---|---|
| n-Propyl carbamate formaldehyde resin (as in Ex. 1) | 25.0 |
| Isopropyl carbamate formaldehyde resin (as in Ex. 1) | 10.0 |
| Magnesium chloride (30% aqueous solution) | 8.4 |
| Water to make 100 parts. | |

These components were mixed at room temperature and pressure to form the composition.

EXAMPLE 3

| Components: | Parts by weight |
|---|---|
| n-Propyl carbamate formaldehyde resin (as in Ex. 1) | 30.0 |
| Isopropyl carbamate formaldehyde resin (as in Ex. 1) | 10.0 |
| Magnesium chloride (30% aqueous solution) | 9.6 |
| "Polasan PEL" | 2.0 |
| "Karamul 142ST" | 2.5 |
| "Neutronyx 600" | 0.2 |
| Water to make 100 parts. | |

The above were mixed at room temperature and pressure to form the composition.

Although magnesium chloride is used in the above example as the catalyst, it is to be understood that any other feasible catalyst may be substituted.

In order to compare compositions containing the n-propyl and isopropyl carbamate formaldehyde resins in the aforementioned proportions with similar compositions utilizing different proportions, a number of such other compositions were also prepared. Since Examples 1 and 3 above contained additional components for lubrication, hand, etc., the compositions used for the comparative tests were also prepared with such additional components in order to make the test as accurate as possible.

These other compositions, prepared in the same manner as Examples 1 and 3, are respectively designated A, B, C, D and E, and are listed in the following Table 1 in accordance with the components thereof and the proportions of such components. In each case, water is added to make 100 parts by weight.

TABLE 1

| Components | A | B | C | D | E |
|---|---|---|---|---|---|
| n-Propyl resin (as in Ex. 1) | 30.0 | | 10.0 | 15.0 | 10.0 |
| Isopropyl resin (as in Ex. 1) | | 30.0 | 20.0 | 15.0 | 30.0 |
| Magnesium chloride (30% sol.) | 7.2 | 7.2 | 7.2 | 7.2 | 9.6 |
| "Polasan PEL" | 2.0 | 2.0 | 2.0 | 2.0 | 2.0 |
| "Karamul 142ST" | 2.5 | 2.5 | 2.5 | 2.5 | 2.5 |
| "Neutronyx 600" | 0.2 | 0.2 | 0.2 | 0.2 | 0.2 |

Each of the compositions respectively designated Ex. 1, Ex. 3, A, B, C, D and E, were applied in the same manner to a cotton broadcloth shirting material by padding individual pieces of the cloth with the respective aqueous solutions shown in Examples 1 and 3 and in Table 1. The wet pick-up in each case was approximately 70% by weight. The cloths were then pinned on frames, dried for 1 minute at 275° F. in a circulating air oven, and then cured for 1½ minutes at 300° F.

Both the cloths treated with the compositions of Examples 1 and 3 and those treated with the compositions designated A, B, C, D and E were tested for "wash-wear" rating in accordance with the standard "AATCC Tentative Test Method 88A–1964T," and for durability under abrasion, stress and strain in accordance with the "Stoll Flex Abrasion Test Method (CCCT19b,5300)." The results are listed in the following Table 2:

TABLE 2

| Formulation | Percent of total Carbamate resins | | Flex abrasion, warp cycles | Wash-wear rating |
|---|---|---|---|---|
| | n-Propyl | Isopropyl | | |
| A | 100 | 0 | 280 | 5.0 |
| B | 0 | 100 | 1,048 | 4.5 |
| Ex. 1 | 67 | 33 | 1,040 | 4.8 |
| C | 33 | 67 | 1,040 | 4.0 |
| D | 50 | 50 | 1,052 | 4.0 |
| Ex. 3 | 75 | 25 | 692 | 4.8 |
| E | 25 | 75 | 1,179 | 4.0 |

A "wash-wear" rating, in order to be satisfactory, must exceed a value of 4.5, while a "flex-abrasion" value, to be satisfactory, must exceed a value of 600. As is clear from Table 2, the only treated fabrics that were satisfactory in both respects were those of Examples 1 and 3.

It should be noted from Table 2 that the results did no follow any forseeable course, since the "flex-abrasion" ratings obtained were not directly proportional to the relative amounts of n-propyl and isopropyl resins used. Therefore, calculating from the values obtained in formulations A and B, Example 1 would be expected to give a "flex-abrasion" rating of 538, but actually gave a rating of 1040. Similarly, Example 3 would be expected to give a "flex-abrasion" rating of 472, but actually gave a rating of 692.

The invention claimed is:

1. A method of treating fabric which comprises coating the fabric with an aqueous composition consisting essentially of n-propyl carbamate formaldehyde resin and isopropyl carbamate formaldehyde resin wherein the proportion of the n-propyl to the isopropyl resin is in the ratio of between about 75:25 and about 67:33 by weight, drying the treated fabric and then curing the fabric.

2. The method of claim 1, wherein the drying is effected for about 1 minute at about 275° F. and the curing is effected for about 1½ minutes at about 300° F.

3. The method of claim 1, wherein the aqueous composition also includes an effective amount of a catalyst.

4. The method of claim 1 wherein the aqueous composition also includes effective amounts of a catalyst, a lubricant, a wetting agent and an acrylic ester interpolymer containing about 40% solids, having a predominant particle size of about 0.1 micron, a viscosity of about 40–150 cps., a pH of 4 to 6, and a nonionic particle charge.

5. A composition for treating fabric consisting essentially of water, n-propyl carbamate formaldehyde resin and isopropyl carbamate formaldehyde resin wherein the proportion of the n-propyl to the isopropyl resin is in the ratio of between about 57:25 and about 67:33 by weight.

6. The composition of claim 5, including an effective amount of a catalyst.

7. The composition of claim 5, including effective amounts of a catalyst, a lubricant, a wetting agent and an acrylate ester interpolymer containing about 40% solids, having a predominant particle size of about 0.1 micron, a viscosity of about 40–150 cps., a pH of 4 to 6, and a nonionic particle charge.

8. A fabric selected from the group consisting of cellulosic fibers and blends of cellulosic fibers and non-cellulosic synthetic fibers, wherein the fabric is impregnated with a mixture consisting essentially of n-propyl carbamate formaldehyde resin and isopropyl carbamate formaldehyde resin in a ratio of between about 75:25 and about 67:33 parts by weight of the n-propyl resin relative to the isopropyl resin.

9. The fabric of claim 8 wherein the impregnant contains effective amounts of a catalyst, a lubricant, a wetting agent and an acrylate ester interpolymer containing about 40% solids, having a predominant particle size of about 0.1 micron, a viscosity of about 40–150 cps., a pH of 4 to 6, and a nonionic particle charge.

References Cited

UNITED STATES PATENTS

| 3,144,299 | 8/1964 | Frick et al. | 8—116.3 |
| 3,160,469 | 12/1965 | Vail et al. | 8—116.3 |
| 3,219,632 | 12/1965 | Frick et al. | 260—72 |

WILLIAM D. MARTIN, *Primary Examiner.*

T. G. DAVIS, *Assistant Examiner.*

U.S. Cl. X.R.

8—116.3; 117—143, 139.4, 138.8, 161; 260—29.4